May 26, 1964  M. P. BENNETT ET AL  3,134,883
ELECTRODE FOR ELECTRICAL RESISTANCE HEATING TOOL
Filed May 23, 1961  2 Sheets-Sheet 1
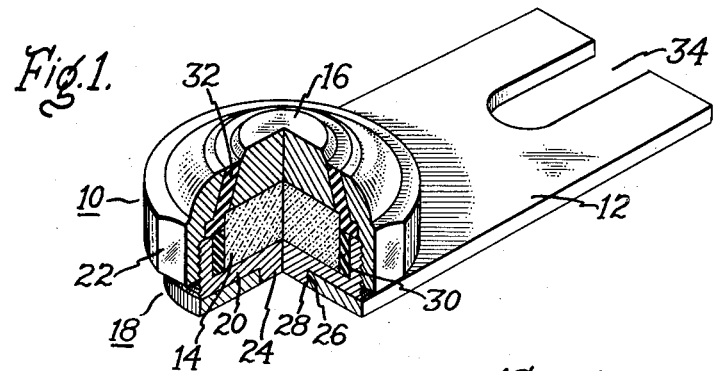
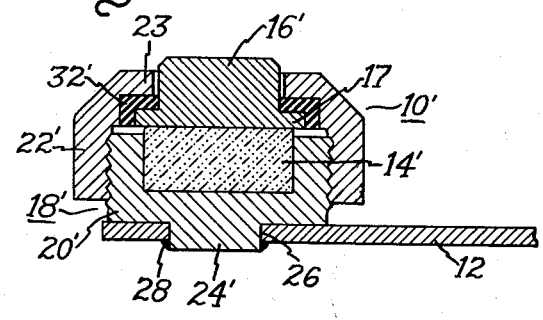
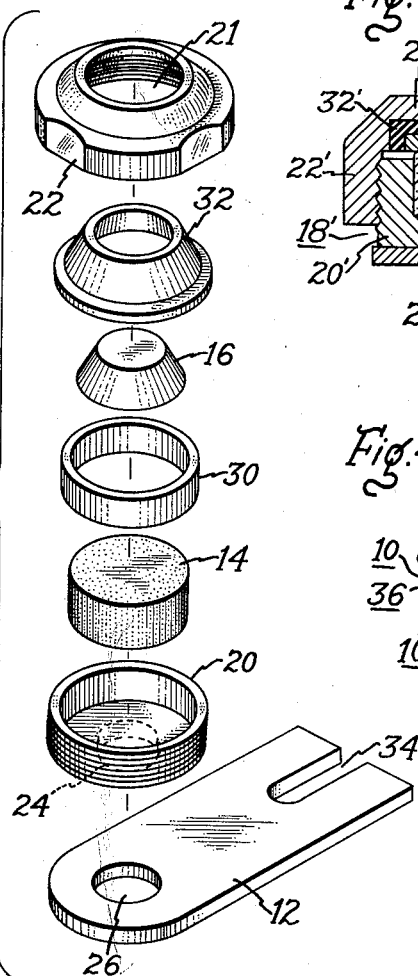
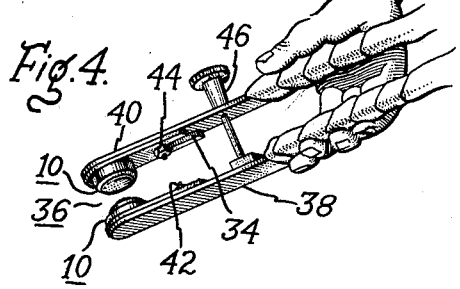
Inventors,
Moreland P. Bennett,
Edward L. Hughes,
by Francis K. Doyle
Their Attorney.

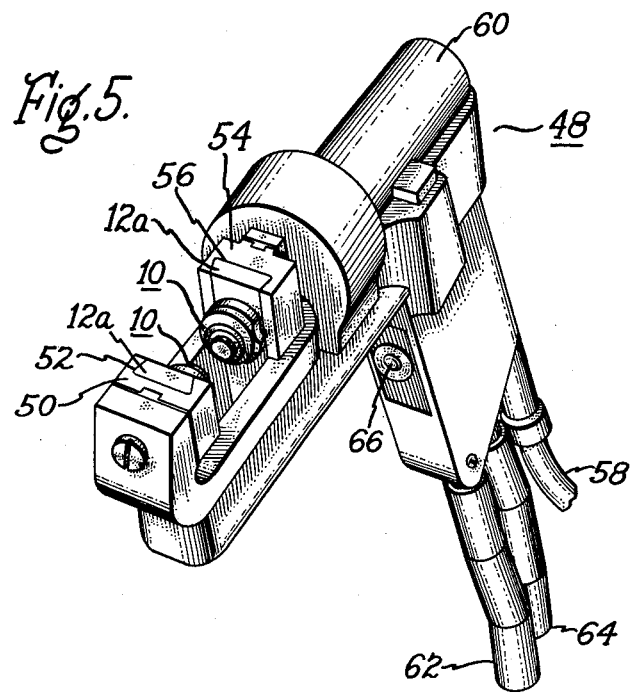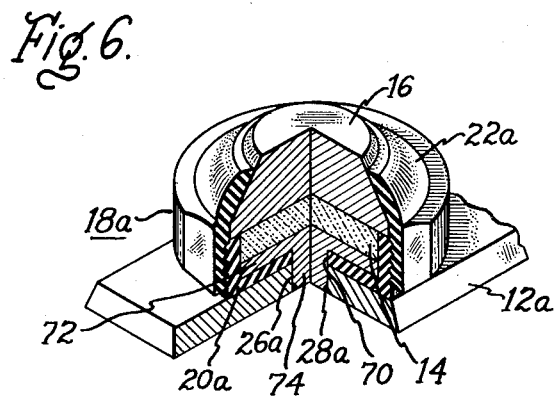

United States Patent Office 3,134,883
Patented May 26, 1964

3,134,883
ELECTRODE FOR ELECTRICAL RESISTANCE
HEATING TOOL
Moreland P. Bennett and Edward L. Hughes, Pittsfield, Mass., assignors to General Electric Company, a corporation of New York
Filed May 23, 1961, Ser. No. 111,940
9 Claims. (Cl. 219—119)

This invention relates to an electrical resistance heating tool for brazing, welding, hot crimping and the like, and, more particularly to a novel electrode for use in such tool.

In the prior art brazing or welding tools, it has been common to use an electrical resistance heating system to heat the electrodes to a sufficient temperature for performing the desired operation. The most commonly used systems are provided with electrodes which are made of either metal or carbon. In general, carbon is desired as the electrode material, since it has a high electrical resistivity and thus very rapidly reaches elevated temperatures. Also, due to its high resistivity, minimum amounts of power are required to obtain the elevated temperatures. However, as will be well understood by those skilled in this art, the carbon electrodes have very poor wear resistance and quickly deteriorate in use. Thus, when a carbon electrode is used in a production tool, it is necessary to frequently replace the carbon electrodes. Further, the carbon is a relatively fragile material and easily breaks under pressure. For this reason, carbon electrodes are unsuited for use in tools where it is desired to make joints or connections requiring high pressure to properly form such joints or connections.

A second commonly used resistance heating system is provided with metallic electrodes. These electrodes generally have very good wear resistance and are able to withstand high pressures when making high pressure joints or connections. However, as compared to carbon, the metals have a low resistance. Therefore, they require large quantities of power to generate sufficient heat. In order to provide the desired heat to the electrodes, to perform the particular operation, it is necessary to conduct a large quantity of electrical power into the electrodes. Further, due to the low resistance of the metallic electrodes, they are very slow to heat up, thus necessitating a relatively long time period to obtain the proper temperature to form the desired connection.

From the above statements, it will be obvious that there is a great need in this art for an electrode which may be used in a resistance heating system, for welding or brazing and the like, that will provide rapid heating to elevated temperatures, that will provide long wear resistance in use, and will be able to withstand high pressures without breaking under the force of such pressure.

It is therefore an object of this invention to provide a novel electrode for use in brazing tools, and the like, that will quickly obtain elevated temperatures without deteriorating in use.

It is a further object to provide a novel electrode for electrical resistance heating tools, which is provided with good, wear-resistance characteristics and requires low power in operation.

It is a further object of this invention to provide a novel electrode for brazing tools, and the like, that will readily obtain elevated temperatures with low power requirements, and which will be useful in making joints with high contact forces.

A still further object of this invention is to provide a novel electrode for use with brazing tools, and the like, which will combine good, wear-resistance characteristics with rapid electrical resistant heating characteristics.

In carrying out this invention in one form, an electrical resistance heating tool is provided with a pair of novel electrodes, each electrode comprises a conductor which is connectable to a source of electric power, a carbon heating element, and a metallic stud or contact. The carbon heating element and the metallic stud are retained in intimate contact in an enclosure or retaining means with the operating portion of the stud extending exteriorly of the enclosure or retaining means. Electrical connections are provided such that the electric current will flow from the conductor through the carbon element and into the metallic stud. The rapid heating of the carbon element will produce thermal heating of the metallic stud to rapidly raise the temperature of such stud. Further, the current flow through the metallic stud will also provide resistance heating to such metallic stud.

The subject matter which is regarded as the invention herein will be particularly pointed out and distinctly claimed in the claims appended hereto. However, it is believed that this invention and the manner in which its various objects and advantages are obtained, as well as other objects and advantages thereof, will be better understood from the following description, when taken in connection with the accompanying drawings, in which:

FIGURE 1 is a perspective view, partially in section of one form of the novel electrode according to this invention;

FIGURE 2 is an exploded perspective view of the electrode shown in FIGURE 1;

FIGURE 3 is an elevation view, in section, showing a second form of the electrode according to this invention;

FIGURE 4 is a perspective view of one form of portable, electrical resistance heating tool which may utilize the novel electrodes of this invention;

FIGURE 5 is a perspective view of a second form of portable, hand-operated brazing or hot crimping tool, or the like, in which the electrodes of this invention may be utilized; and FIGURE 6 is a perspective view partially in section, similar to FIGURE 1, showing another form of the electrode, made according to this invention.

Referring now to the drawing, in which like numerals are used to indicate like parts throughout, and in particular with reference to FIGURE 1, there is shown an electrode in one form according to this invention, the electrode being generally indicated as 10. The electrode comprising a conductor means 12, a carbon heating element 14, electrically connected to such conductor means, and a metallic contact or stud 16 in intimate contact with the carbon heating element. Both the carbon heating element 14 and the metallic stud 16 are securely held in intimate contact, providing both electrical and thermal connections therebetween, by means of a retainer means or enclosure 18. The retainer means 18 also serves to provide an electrical connection between the conductor means 12 and the carbon heating element 14.

From the above it can be seen that the novel electrode of this invention is comprised of a combination of a heating element of carbon, to provide for rapid heating on the passage of current therethrough, and a metallic stud 16, which contacts the desired work piece, providing an extremely strong, wear-resistant surface. Further, the stud 16 and the carbon heating element 14 are held in intimate contact by retaining means 18, enabling excellent thermal conduction between the heating element 14 and the stud 16, thereby providing rapid heating of the metallic stud. Of course, the current flow through the metallic stud 16 encounters the electrical resistance of such stud, further heating the stud by the resistance heating due to such current flow. More specifically, as current flows through the carbon element 14, the carbon is rapidly raised to an elevated temperature. The heating of element 14 is rapidly conducted to stud 16 by thermal conduction. As the temperature of the carbon element 14 increases, it progressively loses its resistivity. This makes the element 14 a better conductor, allowing more current to flow through metallic stud 16. Obviously, the more current that flows through stud 16, the more effective is its electrical resistance to generate heat. Further, as the temperature of stud 16 increases, it reacts in an opposite manner to the carbon element 14, that is, its electrical resistance increases. Therefore, it will be apparent that the stud 16 is first rapidly heated by thermal conduction from the carbon element 14 and then continues to be heated to higher temperatures by the combination of thermal conduction from the carbon element 14 and resistance heating due to its own resistivity.

Considering now particularly FIGURES 1 and 2, there is shown one form of the electrode of this invention. This electrode 10 comprises the carbon element 14 and the metallic element 16, securely held within a retaining means 18. The retaining means 18, as shown, comprises a base portion 20 and a clamping ring 22. As is more clearly shown in FIGURE 1, the base portion 20 of the retaining means 18 is provided with a boss 24, extending from the base thereof, the boss 24 fitting within an opening 26 in the conductor means 12. The boss 24 is firmly secured to the conductor means 12 in any desired manner, such as welding, for example, as indicated at 28 in FIGURE 1.

Referring now more particularly to FIGURE 2 of the drawing showing a preferred assembly of the electrode, it can be seen that the base element 20 of the retaining means 18 is shaped to receive the carbon heating element 14 and an insulating ring 30. The interior of the base 20 of the retainer means is preferably dimensioned such that the carbon heating element 14 and the insulating ring 30 fit snugly therein. The metallic stud 16 is then placed on top of the carbon heating element 14 and the insulating shield 32 is placed thereover. The upper portion of the retaining means, referred to as the clamping ring 22, is then placed over the insulating shield and threaded to the base member 20. The clamping ring 22 is tightened on to the base member 20, so as to force the metallic stud 16 into a firm and intimate contact with the carbon heating element 14. As can be seen from FIGURES 1 and 2, the metallic stud 16 is of a frustroconical shape and the interior of the insulating shield 32 and the clamping ring 22 are provided with a similar contour, such that the tightening of the clamping ring 22 onto the lower portion 20 of the retainer means 18 will firmly force the stud 16 into intimate contact with the carbon heating element 14. An opening 21 is provided in the clamping ring 22, through which the operating portion of the metallic stud 16 may extend or protrude, when the clamping ring 22 is in place. This is more clearly shown in FIGURE 1. The conductor means 12 may be provided with means such as, for example, the slot 34 for connection to any type of portable or stationary electrical resistance heating tool.

Of course, it will be understood that the stud 16 may be of any desired shape. It is preferred that the stud 16 and clamping means 22 be formed so that the clamping means 22 will force the stud 16 into a good thermal and electrical contact with the carbon heating element 14. An alternate form of the electrode, with a different type of stud and clamping means is shown in FIGURE 3. Referring to FIGURE 3, the electrode 10' comprises a carbon element 14' and a metallic contact or stud 16'. The carbon element 14' and the stud 16' are held in firm thermal contact by retaining means 18'. The retaining means 18' has a base portion 20', with a boss member 24', fitting within the opening 26 of the conductor 12. The base portion 20' may be firmly secured to the conductor 12 in any desired manner, such as, for example, welding, the weld being indicated at 28.

To insure the desired firm contact between the carbon element 14' and the stud 16, the stud 16' is provided with an enlarged base or flange member 17. The upper part of the retaining means 18' is the clamping ring 22', the clamping ring 22' being provided with an internal lip or rim member 23. The flange 17 of stud 16' and the lip 23 of clamping ring 22' cooperate to firmly clamp the stud 16' into intimate contact with the carbon element 16. This provides a good thermal and electrical connection between the carbon element 14' and the stud 16'. To insure that all of the current flow through the electrode 10' will pass through the carbon element 14' and to the stud 16', an insulating shield 32' is placed between the clamping ring 22' and the stud 16'. The form of electrode shown in FIGURE 3 may be used in the same manner as the electrode shown in FIGURES 1 and 2, with any desired type of electrical resistance heating tool.

One form of electrical resistance heating tool, which may use the novel electrode of this invention, is shown in FIGURE 4 of the drawing. FIGURE 4 shows one form of a portable brazing tool, or the like, 36, which is provided with a pair of arms 38 and 40, each of the arms being connected to one side of a source of electrical energy (not shown). As noted, each of the sides 38 and 40 is provided with an electrode 10, made according to this invention. The electrodes 10 may be secured to the respective arms 38 and 40 by means of bolts 42 and 44, engaging the electrode conductors 12 through the slot means 34. As will be well understood by those skilled in the art, when it is desired to replace the electrodes 10, such as for a different type of work, it is only necessary to loosen the bolt means 42 and 44 and slide the electrodes 10, 10 from beneath such bolt means through the open slot 34. In the same manner, replacement electrodes may be readily slid on to the arms 38 and 40 and firmly secured thereto by the bolt means 42 and 44. A combined stop and securing means 46 may be provided, holding the two arms 38 and 40 in close relationship, as shown, and enabling the arms to be moved into contact with each other by a squeezing pressure of the hand on the insulated portion of the arms 38 and 40, as indicated in FIGURE 4.

It is believed that the operation of the electrical resistance heating tool 36 is clearly evident from the above description. A work piece which it is desired to braze or weld, may be inserted between the two electrodes 10, 10 and the electrodes brought into contact with the work piece by a squeezing pressure of the hand. When the electrodes contact the work piece (not shown), a circuit will be completed between the lower arm 38 and the electrode 10, the work piece (not shown) the upper electrode 10 and the upper arm 40. In this manner, electric current will flow through the carbon heating element 14 and the metallic stud 16, thereby heating the stud 16 to the desired heat to perform the particular work operation, as previously described. From the description of FIGURE 4, the manner in which the electrodes of this invention may be utilized in a hand operated, portable brazing or welding tool, or the like will be clear to those skilled in this art. Of course, as will be well understood, due to the combination of the carbon heating element 14 and the metallic stud 16, the metallic studs 16 are rapidly brought to an elevated temperature to perform the desired work operation. Further, inasmuch as the metallic studs contact the work piece to perform the desired work operation, it will be understood that very little wear is caused on the metallic studs as compared to the wear which would be effected were the carbon elements used solely as the electrode element.

In FIGURE 5 of the drawing, there is shown a second type of portable, hand-operated electrical resistance heating tool, which may utilize the electrodes of this invention. The portable, hand-operated tool 48 is provided with a pair of electrodes 10, in the same manner as the portable tool 36. However, in the electrical resistance heating tool 48, the front electrode 10 is mounted in a stationary anvil 50 by any desired means, for example, by providing the conductor element 12a with beveled sides, as indicated in FIGURE 5, to fit within the slot 52 of the anvil 50. In the same manner, the second electrode 10 is fitted into a movable anvil 54 by means of the beveled conductor 12a fitting into the slot 56. Current is provided to the stationary anvil 50 and the movable anvil 54 by means of an electric power cord 58 which is connected to any desired source of electrical energy. As will be well understood by those skilled in the art, the electrical energy may be provided to each of the anvils 50 and 54 continuously, but until a work piece is placed within the tool, and the electrodes 10, 10 are brought into contact with such work piece, there is no flow of electrical current. The movable anvil 54 is mounted on the rod of a hydraulic or pneumatic cylinder 60 which is fed through the hydraulic or air lines 62, 64, in a manner well understood by those skilled in the art. The cylinder 60 is actuated by means of a button or trigger 66 placed in the handle of the portable tool 48. No further description is considered necessary of the operation of the trigger 66 and the cylinder 60, since these are entirely conventional elements and are well known in the art.

It will be clear that the tool 48, as shown in FIGURE 5, may be used for making high pressure connections between work pieces as desired. The cylinder 60 may provide any desired pressure between the electrodes 10, 10. As will be well understood, the amount of pressure provided is entirely dependent upon the size of the cylinder 60 and the hydraulic fluid or air pressure provided thereto. By means such as the tool 48, high pressure contacts can be made utilizing the electrodes of this invention. Inasmuch as the electrodes are provided with the metallic stud 16, and the carbon heating element 14, both retained within the retaining element 18, it will be understood that extremely high pressure may be applied to the electrodes without any damage to the carbon element 14.

Tests have shown that forces may be applied to the surface of the studs 16 in the range of 15–20,000 pounds without damage to the electrodes. Of course, it will be readily apparent that applying a force between 7 and 10 tons to a small carbon electrode would be completely impossible, because of the nature of the carbon element. However, by use of this invention, where the carbon is retained within the retainer means 18 and the metallic element 16 is provided in intimate contact therewith, it is very possible to provide these high forces on the electrodes without any damage to the carbon element.

In tests made on the electrodes of this invention, they have been found to have an unusually long life. Throughout many hours of testing it has been noted that there was no visible deterioration of the carbon heating element. It is believed that carbon has a tendency to deteriorate when heated in the air due to the combination of the carbon with oxygen from the air. In this invention, the enclosure or retaining means 18 substantially eliminates the air from contacting the carbon. This feature of the invention is considered to provide substantially indefinite life to the carbon heating element. Thus, it can be seen that by means of this invention, novel electrodes are provided which provide all of the desired objects herein before set forth.

Referring now to FIGURE 6 of the drawing, another embodiment of the electrode of this invention is shown. In this embodiment the electrode 10a is connected to a conductor 12a, shown as being provided with beveled sides so as to fit within the slots 52, 56 of the anvils 50, 54, respectively, of the portable tool 48. Of course, it will be understood that the conductor could also be the same as the conductor shown in FIGURES 1 and 2, were this desired. The retaining means 18a comprises a bottom portion 20a which is provided with an opening therein, indicated at 70. As shown by the cross hatching of the cross section in FIGURE 6, the lower portion 20a of the retainer element 18a and the upper clamping ring 22a are made of an insulating material, such as a heat resistant synthetic resin, so as to confine the flow of electric current in electrode 10a to the carbon element 14 and the metallic stud 16. In order to provide the desired electrical contact between the carbon element 14 and the conductor means 12a, a metallic means 72 is provided, fitting within the bottom of base member 20a and having a boss means 74 which extends through the opening 70 in the base 20a and into the opening 26a in the conductor means 12a. In the same manner as shown in FIGURE 1, the boss 74 is firmly secured to the conductor means 12a in any desired manner, welding being indicated at 28a for illustrative purposes only. As can be seen, by means of the electrode shown in FIGURE 6, it is possible to dispense with the use of the insulating ring 30 and the insulating shield 32, and still provide for the current to go from the conductor 12a through the carbon heating element 14 and the stud 16. Thus, it can be seen that the electrode, shown in FIGURE 6, will perform in the same manner as the electrodes previously described and shown in FIGURES 1, 2 and 3. Of course, it will be obvious that the retaining means 18a and electrical contact means 72 could be provided for the electrode shown in FIGURE 3, if desired.

While there has been shown and described the presently preferred embodiments of the electrode of this invention, as required by the patent statutes, it will be well understood by those skilled in the art that various changes and modifications may be made in these embodiments. Of course, it will be understood, that the electrode of this invention is not limited to the particular types of tools shown but may be utilized in any type of brazing, welding, hot crimping, or similar tool, portable or stationary, where the advantages of this electrode may be obtained. It is therefore, to be understood, that the description hereinbefore set forth is not to be considered as a limitation on the invention, but, that changes may be made within the spirit and scope of this invention as set forth in the appended claims.

What is claimed as new and which it is desired to secure by Letters Patent of the United States is:

1. An electrode for use in brazing, welding, and similar electrical resistance heating tools wherein electric current is caused to flow through a pair of electrodes by a work piece placed between the electrodes, said electrode comprising:
    a conductor means connectable to one side of an electrical energy source;
    a carbon heating element electrically connected to said conductor means;
    and a metallic stud in electrical and thermal contact with said carbon heating element;
    said metallic stud having an operating portion for contacting a work piece;
    said carbon element and said stud being held in intimate contact by a retaining means;
    said carbon element snugly fitting within said retaining means;
    said retaining means forming an enclosure for said element and said stud and having an opening therein through which said operating portion of said stud protrudes;
    said retaining means made of a conducting material;
    and insulating means insulating the sides of said retaining means from said stud.

2. An electrode as claimed in claim 1 in which said insulating means insulates the sides of said retaining means from said stud and said carbon element.

3. An electrode as claimed in claim 2 in which said retaining means electrically connects said carbon element to said conductor means.

4. An electrode as claimed in claim 1 in which said retaining means electrically connects said carbon heating element to said conductor means.

5. An electrode as claimed in claim 1 in which cooperating means are provided on said stud and said retaining means for forcing said stud into intimate contact with said carbon element.

6. An electrode as claimed in claim 5 in which said cooperating means comprise a flange on said stud and an internal rim on said retaining means, said rim contacting said flange to force said stud into contact with said carbon element.

7. An electrode as claimed in claim 5 in which said cooperating means comprise a frustro-conical shaped stud and a two piece retaining means, the upper portion of said retaining means being removably secured to the lower portion of said retaining means, said upper portion having its inner surface of frustro-conical shape whereby when said upper portion is secured to said lower portion said interior surface engages said stud forcing said stud into contact with said carbon element.

8. An electrode as claimed in claim 1 in which said retaining means provides a support for said carbon heating element permitting said stud to exert high pressure on a work piece without damaging said carbon heating element.

9. An electrode as claimed in claim 8 in which said retaining means and said stud enclose said carbon element to substantially eliminate air contacting said carbon element.

References Cited in the file of this patent
UNITED STATES PATENTS

| | | |
|---|---|---|
| 497,793 | Jenkins | May 23, 1893 |
| 1,304,227 | Weed | May 20, 1919 |
| 1,330,563 | Weed | Feb. 10, 1920 |
| 1,363,474 | Kuhn et al. | Dec. 28, 1920 |
| 2,102,032 | Richardson | Dec. 14, 1937 |
| 2,106,439 | Schubert | Jan. 25, 1938 |
| 2,346,088 | Shobert | Apr. 4, 1944 |
| 2,424,848 | Reitan | July 29, 1947 |
| 2,734,979 | Highley | Feb. 14, 1956 |